US009285655B2

(12) United States Patent  
Shibuno (10) Patent No.: US 9,285,655 B2  
(45) Date of Patent: Mar. 15, 2016

(54) IMAGE PICKUP APPARATUS PERFORMING FOCUS OPERATION WHEN PROXIMITY SENSOR SENSES AN OBJECT

(71) Applicant: Panasonic Corporation, Osaka (JP)

(72) Inventor: Koji Shibuno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 71 days.

(21) Appl. No.: 13/939,680

(22) Filed: Jul. 11, 2013

(65) Prior Publication Data

US 2014/0015989 A1 Jan. 16, 2014

(30) Foreign Application Priority Data

Jul. 13, 2012 (JP) ................................. 2012-157197

(51) Int. Cl.
H04N 5/228 (2006.01)
G03B 13/36 (2006.01)
H04N 5/232 (2006.01)
G02B 7/36 (2006.01)

(52) U.S. Cl.
CPC .................. *G03B 13/36* (2013.01); *G02B 7/36* (2013.01); *H04N 5/23212* (2013.01); *G03B 2217/005* (2013.01)

(58) Field of Classification Search
CPC .... G02B 7/36; G03B 13/36; G03B 2217/005; H04N 5/23212

USPC .............. 348/208.99, 208.1, 208.4, 345, 346, 348/349, 350, 352, 353

See application file for complete search history.

(56) References Cited

U.S. PATENT DOCUMENTS

| 4,575,212 A | 3/1986 | Kitaura et al. |
| 5,315,339 A * | 5/1994 | Hamada et al. ............... 396/130 |
| 5,613,166 A * | 3/1997 | Hamada et al. ................. 396/80 |
| 6,009,279 A | 12/1999 | Kai et al. |
| 7,079,188 B2 * | 7/2006 | Shiraishi et al. .............. 348/350 |
| 2003/0231291 A1 * | 12/2003 | Kitajima et al. ............... 355/56 |
| 2004/0017483 A1 * | 1/2004 | Kitsugi et al. ........... 348/207.99 |
| 2004/0135900 A1 * | 7/2004 | Pyle et al. .................. 348/231.3 |
| 2004/0212713 A1 * | 10/2004 | Takemoto et al. ....... 348/333.09 |
| 2006/0171697 A1 | 8/2006 | Nojima |
| 2007/0086764 A1 * | 4/2007 | Konicek .......................... 396/56 |
| 2009/0059058 A1 * | 3/2009 | Okabe et al. .................. 348/345 |
| 2013/0258089 A1 * | 10/2013 | Lyons et al. .................... 348/77 |
| 2014/0253783 A1 * | 9/2014 | Springer et al. .............. 348/347 |

FOREIGN PATENT DOCUMENTS

| JP | 59-152410 | 8/1984 |
| JP | 4-347814 | 12/1992 |

(Continued)

*Primary Examiner* — Amy Hsu  
(74) *Attorney, Agent, or Firm* — Panasonic Patent Center (57) ABSTRACT

An image pickup apparatus including an imaging unit configured to capture an image of a subject to output image data, an optical system that includes a focus lens and is configured to form an image of the subject on the imaging unit, a finder that allows a user to view the subject, a proximity sensor configured to sense proximity of an object to the finder, and a controller configured to perform a focus operation to drive the focus lens to focus on the image of the subject when the proximity sensor senses proximity of an object, and fix the position of the focus lens after completion of the focus operation until a predetermined condition is satisfied.

9 Claims, 5 Drawing Sheets

(56) References Cited

FOREIGN PATENT DOCUMENTS

| JP | 8-62656 | 3/1996 |
| JP | 10-232344 | 9/1998 |
| JP | 2006-215266 | 8/2006 |

* cited by examiner

IMAGE PICKUP APPARATUS PERFORMING FOCUS OPERATION WHEN PROXIMITY SENSOR SENSES AN OBJECT

BACKGROUND

1. Technical Field

The present disclosure relates to an image pickup apparatus with a viewfinder and an autofocus (AF) function.

2. Related Art

Japanese patent application publication No. JP04-347814A discloses an image pickup apparatus with an autofocus function. The image pickup apparatus has an eye proximity sensor for sensing that a user is looking into a viewfinder (brings his eye close to a viewfinder) and a focus drive controller for driving a focus lens into focus in response to sensing a proximity of a user's eye by the eye proximity sensor by using a phase-difference method.

SUMMARY

The present disclosure provides an image pickup apparatus having a viewfinder and an autofocus function with improved convenience.

An image pickup apparatus includes an imaging unit configured to capture an image of a subject to output image data, an optical system that includes a focus lens and is configured to form an image of the subject on the imaging unit, a finder that allows a user to view the subject, a proximity sensor configured to sense proximity of an object to the finder, and a controller configured to perform a focus operation to drive the focus lens to focus on the image of the subject when the proximity sensor senses proximity of an object, and fix the position of the focus lens after completion of the focus operation until a predetermined condition is satisfied.

The image pickup apparatus according to the present disclosure is advantageous in improving convenience of an image pickup apparatus which has a viewfinder and an autofocus function.

DETAILED DESCRIPTION OF PREFERRED EMBODIMENTS

Embodiments will be described below in detail with reference to the drawings as required. However, unnecessarily detailed description may be omitted. For example, detailed description of already known matters and redundant description of substantially the same configuration may be omitted. All of such omissions are for facilitating understanding by those skilled in the art by preventing the following description from becoming unnecessarily redundant.

The inventor(s) provide the accompanying drawings and the following description for those skilled in the art to fully understand the present disclosure and does not intend to limit the subject described in the claims by the accompanying drawings and the following description.

First Embodiment

A digital camera 100 (an example of the image pickup apparatus, see FIG. 1) according to a first embodiment has a viewfinder and an autofocus (AF) function. The digital camera 100 has an eye proximity sensor which can sense that a user (object) brings his eye close to the viewfinder (approaches the viewfinder). The digital camera 100 performs an AF operation when the user brings his eye close to the viewfinder. The digital camera 100 can lock the AF state (i.e., fix the position of a focus lens) after the completion of the AF operation until the predetermined condition is satisfied. The configuration and the operations of the digital camera 100 will be described below.

1. Configuration

The configuration of the digital camera will be described below with reference to the accompanying drawings.

1-1. Configuration of the Digital Camera

Figure 1:
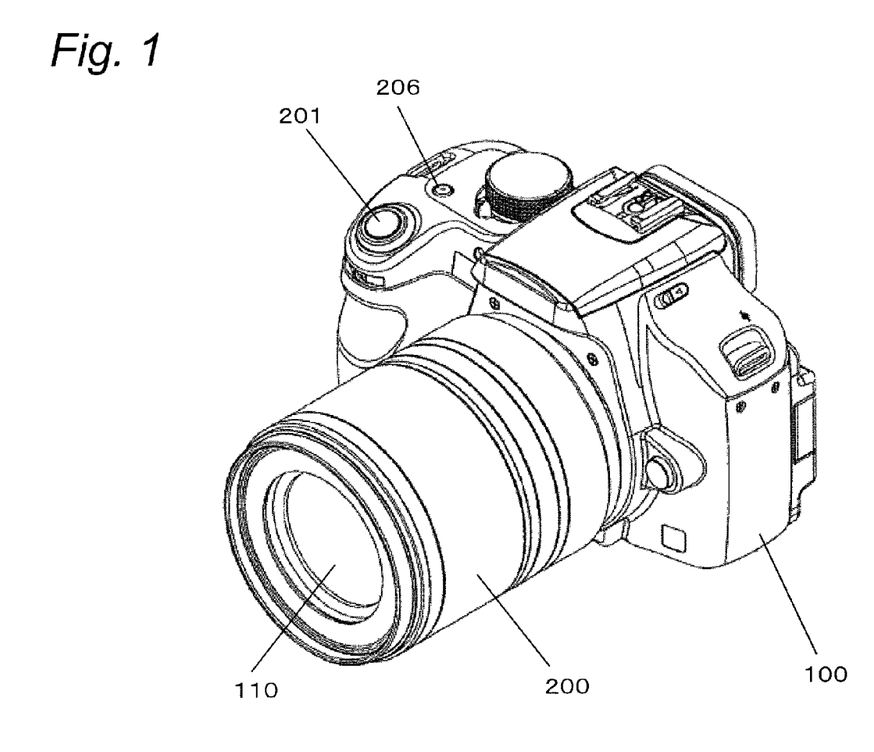
FIG. 1 is a front perspective view of a digital camera according to a first embodiment.

FIG. 1 is a perspective view of the digital camera 100 viewed from the front thereof. The digital camera 100 has a barrel 200 storing an optical system 110 at the front of the digital camera 100. The digital camera 100 also has operation buttons such as a still image release button 201 and a moving image release button 206 on the top surface.

Figure 2:
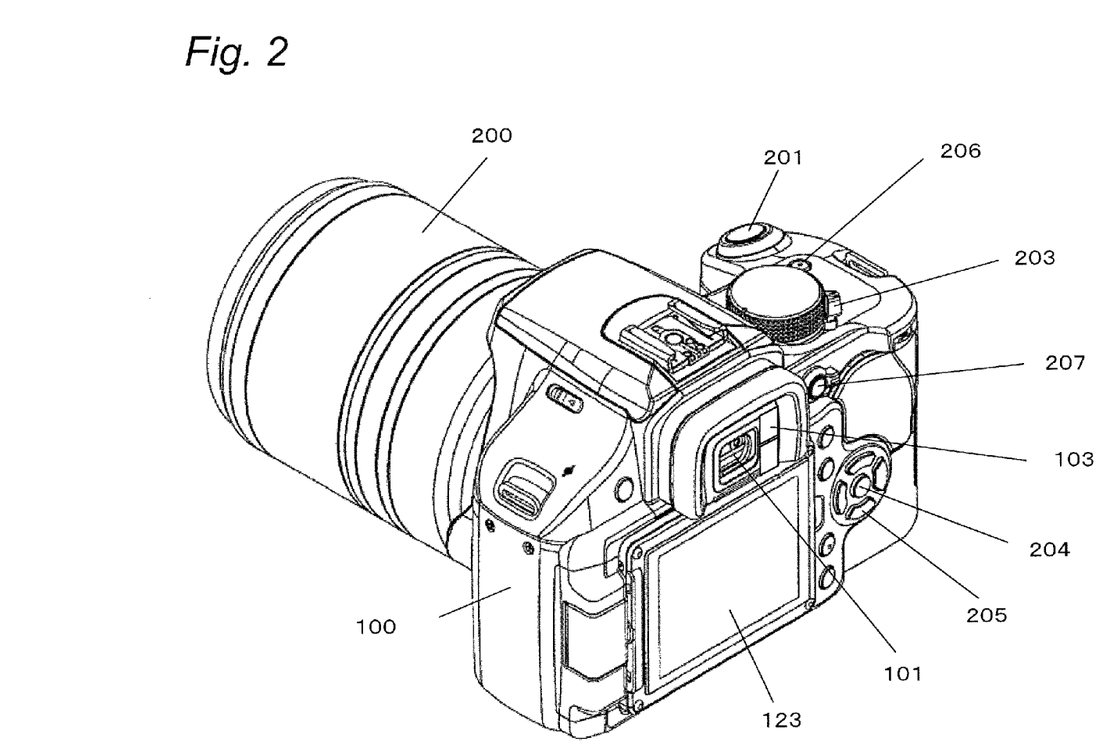
FIG. 2 is a rear perspective view of the digital camera according to the first embodiment.

FIG. 2 is a perspective view of the digital camera 100 viewed from the back thereof. The digital camera 100 has a power switch 203 on the top surface. The digital camera 100 is also provided with a liquid crystal display (LCD) monitor 123, a viewfinder 101, an eye proximity sensor 103, and operation buttons including a center button 204, directional buttons 205, and a mode switch 207, on the back of the digital camera 100.

Figure 3:
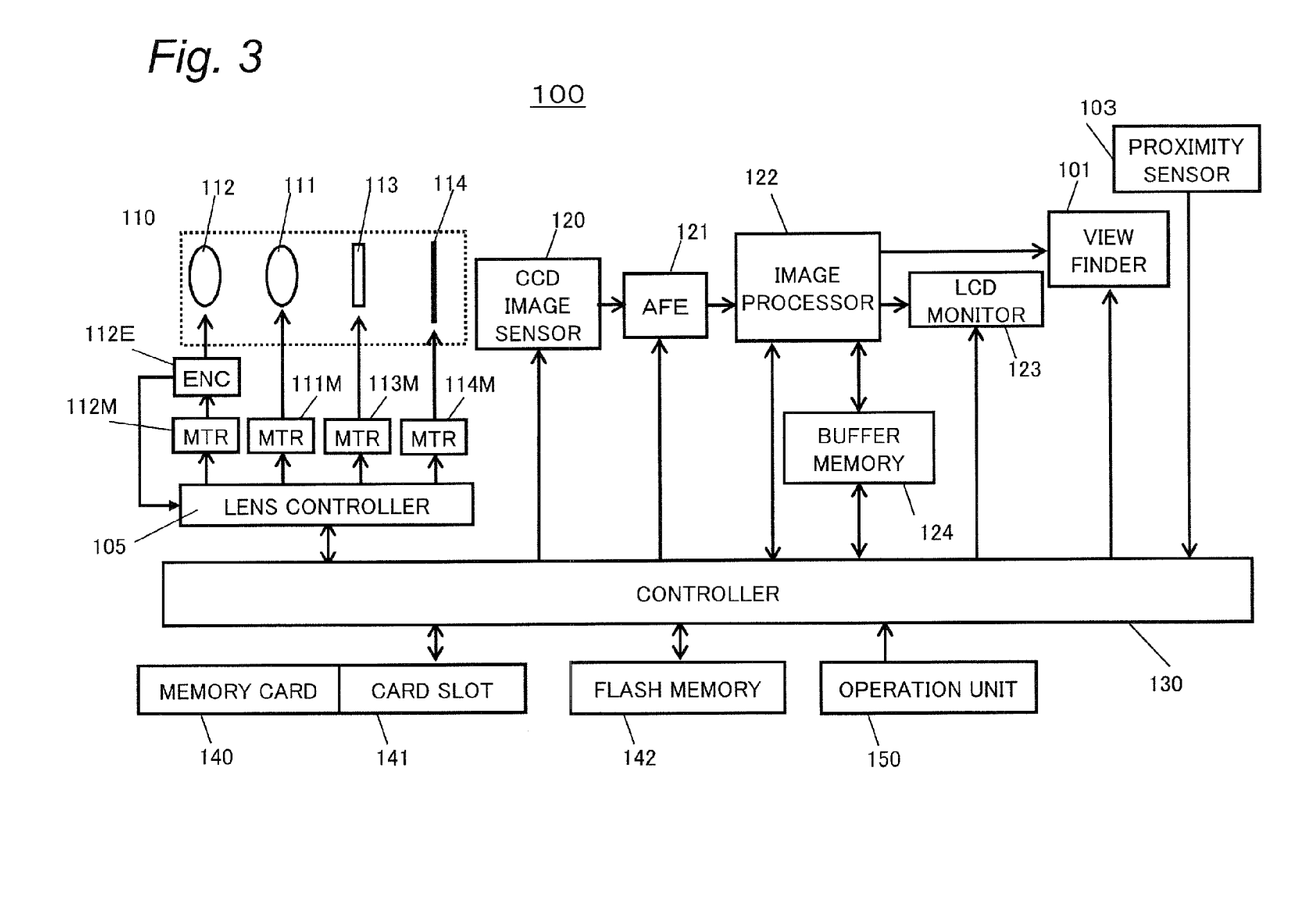
FIG. 3 is an electric schematic diagram of the digital camera according to the first embodiment.

FIG. 3 is an electric block diagram of the digital camera 100. The digital camera 100 captures a subject image formed through the optical system 110 with a CCD image sensor 120. The CCD image sensor 120 captures a subject image formed on an image capturing plane to generate image data based on the subject image. The image data generated by capturing is subject to various types of processing in the AFE (Analog Front End) 121 and the image processor 122. The generated image data is recorded on a recording medium such as a flash memory 142 or a memory card 140 (this embodiment is described assuming that the image data is recorded on the memory card 140). The image data recorded on the memory card 140 is displayed on the liquid crystal display monitor 123 or the viewfinder 101 in response to the user's operation on an operation unit 150. The respective components illustrated in FIG. 1 to FIG. 3 will be described below in detail.

The optical system 110 forms a subject image on the image capturing plane of the CCD image sensor 120. The optical system 110 includes a focus lens 111, a zoom lens 112, a diaphragm 113, a shutter 114, and so on. Although not shown, the optical system 110 may include an Optical Image Stabilizer (OIS) lens. In that case, the controller 130 drives the OIS lens in the direction for reducing a blur in the subject image which is to be formed on the image capturing plane of the CCD image sensor 120 by the optical system 110, based on the output from a camera shake sensing unit such as an acceleration sensor. Incidentally, each lens included in the optical system 110 may be composed of any number of lenses or any number of lens groups.

The focus lens 111 is used for adjusting a focusing state of the subject. The zoom lens 112 is used for adjusting an angle of view of the subject. The diaphragm 113 is used for adjusting a light quantity incident on the CCD image sensor 120. The shutter 114 adjusts the exposure time of light incident on the CCD image sensor 120. The focus lens 111 is driven by the motor 111M. The zoom lens 112 is driven by the motor 112M. The diaphragm 113 is driven by the motor 113M. The shutter 114 is driven by the motor 114M. The motors 111M to 114M are driven in accordance with control signals notified by a lens controller 105 (an example of a motor controller).

A DC motor is used for the motor 112M. That is, the motor 112M has a magnet for motor (not shown) and a motor coil (not shown). When DC voltage is applied to the motor coil under the control of the lens controller 105, the magnet for motor rotates and a rotating shaft of the motor 112M rotates. When the motor 112M rotates, a one phase type rotary encoder 112E (hereinafter, referred to as "encoder") generates a pulse in accordance with the number of revolutions. The pulse generated by the encoder 112E is input to the lens controller 105 and the pulse number is counted.

The lens controller 105 drives the motors 111M to 114M according to instructions from the controller 130 to control the optical system 110. The lens controller 105 includes a counter (not shown). The lens controller 105 can detect a position of the zoom lens 112 by counting the pulses generated by the encoder 112E. The lens controller 105 may be realized by a hardwired electronic circuit or a microcomputer using a program. The lens controller 105 may also be integrated into a single semiconductor chip together with the controller 130 and the like.

The CCD image sensor 120 (an example of the imaging unit) captures a subject image formed through the optical system 110 and generates image data. The CCD image sensor 120 can generate a new frame of image data at every predetermined time period while the digital camera 100 is in the shooting mode.

In the AFE 121, noise suppression by correlated double sampling, amplification to the input range width of an A/D converter with an analog gain controller, and A/D conversion with an A/D convertor are performed on the image data read out from the CCD image sensor 120. Then, the AFE 121 outputs the image data to the image processor 122.

The image processor 122 performs various types of processing on the image data output from the AFE 121. The various types of processing include, but not limited to, smear correction, white balance correction, gamma correction, YC conversion processing, electronic zoom processing, compression, and decompression. The image processor 122 notifies the controller 130 of values including a brightness value for controlling auto exposure (AE), a contrast value for controlling AF, and RGB output values for controlling white balance, which are acquired while the image data is processed. The image processor 122 stores the image information which has been subject to the various types of processing in the buffer memory 124. The image processor 122 may be implemented by a hardwired electronic circuit or a microcomputer using a program. The image processor 122 may also be integrated into a single semiconductor chip together with the controller 130 and the like.

The liquid crystal display monitor 123 and the viewfinder 101 are provided on the back of the digital camera 100. The liquid crystal display monitor 123 and viewfinder 101 display an image based on the image data processed by the image processor 122. The viewfinder 101 is an electronic viewfinder. Images displayed on the liquid crystal display monitor 123 and the viewfinder 101 include a through image and a recorded image.

The through image is an image which is composed of new frames of image data generated by the CCD image sensor 120 and successively displayed every predetermined period. In general, when the digital camera 100 is in the shooting mode, the image processor 122 generates the through image from the image data generated by the CCD image sensor 120. Viewing the through image displayed on the liquid crystal display monitor 123 and the viewfinder 101, the user can take an image of a subject while confirming the composition of the subject.

The recorded image is an image which is read out from the memory card 140 and is displayed on the liquid crystal display monitor 123 when the digital camera 100 is in the reproducing mode. The recorded image is an image which is generated by reducing the pixel count of the image data with high pixel count recorded on the memory card 140 to display it on the liquid crystal display monitor 123 and the viewfinder 101.

The image data with high pixel count recorded on the memory card 140 is generated by the image processor 122 based on the image data generated by the CCD image sensor 120, after receiving a user's operation on the release button.

When the eye proximity sensor 103 senses proximity of an object to the viewfinder 101, it notifies the controller 130 of the sensed result. The eye proximity sensor 103 is arranged near the viewfinder 101. Therefore, the eye proximity sensor 103 can sense proximity (approximation) of the user's face when the user brings his face close to the viewfinder 101 to look into it (brings his eye close to the viewfinder 101). While the eye proximity sensor 103 is sensing the eye proximity, the controller 130 controls the viewfinder 101 to display the image. On the other hand, when the eye proximity sensor 103 is not sensing the eye proximity, the controller 130 controls the liquid crystal display monitor 123 to display the image.

The controller 130 may be made of a hardwired electronic circuit or may be made of a microcomputer or the like. Further, the controller 130 may be integrated into a semiconductor chip together with the image processor 122 and the like. The ROM needs not to be provided inside the controller 130 and may be provided outside the controller 130.

The buffer memory 124 is a storage device that functions as a work memory for the image processor 122 and the controller 130. The buffer memory 124 can be implemented by a DRAM (Dynamic Random Access Memory) or the like. The flash memory 142 functions as an internal memory for recording the image data and setting information of the digital camera 100.

The card slot 141 is a connection device that allows the memory card 140 to be attached and detached. The card slot 141 allows the memory card 140 to be electrically and mechanically connected thereto. The card slot 141 may also be provided with a function for controlling the memory card 140.

The memory card 140 is an external memory that contains a recording unit such as a flash memory. The memory card 140 is capable of recording data such as the image data to be processed in the image processor 122.

The operation unit 150 collectively refers to operation buttons and operation dials provided on the exterior of the digital camera 100 for receiving a user's operation. For example, the operation unit 150 includes the still image release button 201, the moving image release button 206, the power switch 203, the center button 204, the directional buttons 205, and the mode switch 207, as illustrated in FIG. 1 and FIG. 2. When the operation unit 150 receives a user's operation, it notifies the controller 130 of the respective operation instructing signals.

The still image release button 201 is a push button which works in two stages of the halfway-pressed state and the fully-pressed state. When the user presses the still image release button 201 halfway, the controller 130 performs AF (Auto Focus) control or AE (Auto Exposure) control to decide on the shooting conditions. Subsequently, when the still image release button 201 is pressed fully by the user, the controller 130 performs the shooting processing. The controller 130 records, as a still image, the image data captured at the moment of the fully-pressing operation onto the memory card 140 or the like. In the following description, simple expression of "pressing" the still image release button 201 means the "fully-pressing" of the still image release button 201.

The moving image release button 206 is a push button for instructing start/finish of moving image recording. When the user presses the moving image release button 206, the controller 130 records, successively as a moving image, the image data generated by the image processor 122 based on the image data generated by the CCD image sensor 120 in a recording medium such as the memory card 140. Then the user presses the moving image release button 206 again, recording of the moving image stops.

The power switch 203 is a switch for the user to instruct the power supply for the respective components of the digital camera 100. When the power switch 203 is operated by the user to the power ON side during the power OFF state, the controller 130 supplies power to the respective components of the digital camera 100 to activate them. When the power supply button 203 is operated by the user to the power OFF side during the power ON state, the controller 130 stops supplying power to the respective components.

The center button 204 is a push button. When the center button 204 is pressed by the user while the digital camera 100 is in the shooting mode or the reproducing mode, the controller 130 displays a menu screen on the liquid crystal display monitor 123. The menu screen is provided for the user to set respective conditions for the shooting operation/reproducing operation. The information set on the menu screen is recorded on the flash memory 142. The center button 204 also functions as a decision button, when it is pressed while the respective conditional setting items are selected.

The directional buttons 205 are push buttons arranged in the upward/downward/leftward/rightward directions. By pressing any one of the directional buttons 205, the user can select an item of the respective conditional items displayed on the liquid crystal display monitor 123.

The mode switch 207 is a push button arranged in the upward/downward directions. By pressing either direction of the mode switch 207, the user can switch the state of the digital camera 100 to the shooting mode or the reproducing mode.

Here, the CCD image sensor 120 is an example of an imaging unit. The viewfinder 101 is an example of a finder. The eye proximity sensor 103 is an example of a proximity sensor. The controller 130 is an example of a controller. The still image release button 201 is an example of a receiving unit. The still image release button 201 is an example of a shutter button.

2. Operation 2-1. Shooting Operation of Digital Camera

Figure 4:
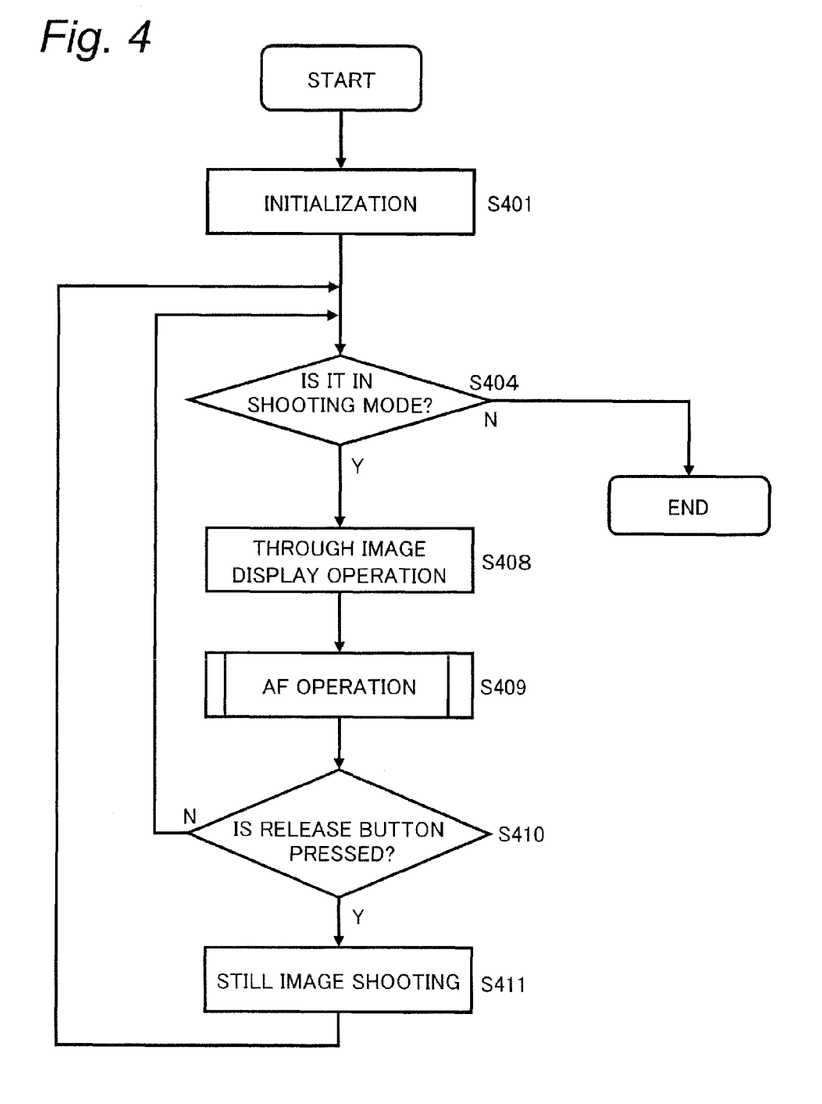
FIG. 4 is a flow chart describing operations in a shooting mode according to the first embodiment.

The shooting control of the digital camera 100 will be described. The digital camera 100 performs processing of recording the shot image data. FIG. 4 is a flow chart of shooting control of the digital camera 100 in the shooting mode. The digital camera 100 can shoot a moving image and a still image in the shooting mode. In the description below, it is assumed that the digital camera 100 takes a still image in the shooting mode.

When the digital camera 100 enters the still image shooting mode in response to the user's operation on the mode switch 207, the controller 130 performs initializing processing necessary to record the still image (S401).

Then, the controller 130 repeats processing for confirming input from the user or the display processing at predetermined period (S404 to S410). Specifically, the controller 130 repeats processing for confirming the state of the mode switch 207 (shooting mode) (S404), processing for displaying a through image (S408), the AF operation (S409), and processing for monitoring the pressing operation on the still image release button 201 (S410) at predetermined period. In the embodiment, the predetermined period is set to 1/60 second. Meanwhile, in step S404, when the state of the mode switch 207 is not the shooting mode, the processing of the shooting mode is finished.

In step S408, the CCD image sensor 120 performs the image capturing operation and outputs the image data. The image processor 122 processes the image data to generate a through image. Further, the image processor 122 calculates a contrast value for AF control from the image data. The contrast value can be calculated, for example, as the sum or the average of high frequency components contained in the image data. The controller 130 causes at least either of the liquid crystal display monitor 123 and the viewfinder 101 to display the generated through image. In the digital camera 100 of the embodiment, the controller 130 switches the device for displaying the through image based on whether the eye proximity sensor 103 is sensing proximity of a user's eye.

In step S409, the controller 130 performs the AF operation. The AF operation is a typical contrast AF method which drives the focus lens 111 based on the contrast value calculated from the captured image data. The controller 130 calculates the contrast value from the image data captured in step S408. The controller 130 drives the focus lens 111 of the optical system 110 based on the result of comparing the calculated contrast value with the contrast value of the image data captured previously. Since the AF operation is performed every 1/60 second in step S409, the controller 130 controls driving of the focus lens 111 at the same timing as the AF operation. Therefore, the AF operation is repeatedly performed at that cycle until the optical system 110 forms the subject image on the CCD image sensor 120 in the focused state. The AF operation will be described in detail later with reference to the flow chart of FIG. 5.

The controller 130 monitors whether the still image release button 201 is pressed by the user while performing the AF operation (S410). When the controller 130 detects that the still image release button 201 is pressed, it performs the still image shooting processing (S411). When the still image shooting processing is finished, the controller 130 repeats the processing from step S404.

On the other hand, when the controller 130 does not detect the pressing on the still image release button 201, it repeats the processing from step S404.

Figure 5:
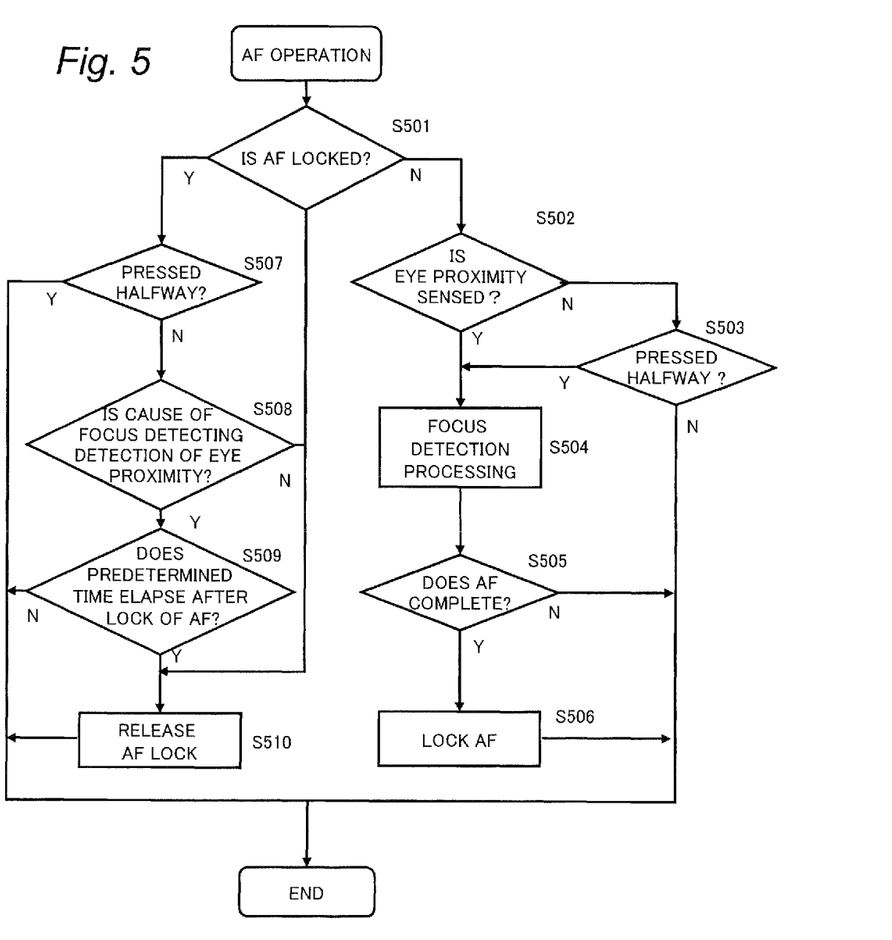
FIG. 5 is a flow chart describing AF operation according to the first embodiment.

The AF operation will be described in detail with reference to the flow chart of FIG. 5. The controller 130 determines whether the autofocus (AF) is currently locked or not (step S501). Here, the fact that AF is locked refers to fixing the position of the focus lens 111 without performing the AF operation. The controller 130 confirms whether an AF lock flag is set or not. When the AF lock flag is set, the controller 130 determines that the AF is locked. The AF lock flag will be described later.

When the AF is not locked ("N" in step S501), the controller 130 determines whether the user is bringing his eye close to the viewfinder 101 (corresponding to a first condition) by referring to the sensing result from the eye proximity sensor 103 (S502). Please note that when the lock of AF is released while the eye proximity sensor 103 is sensing the proximity of the user's eye, it is assumed, for convenience of description, that the controller 130 determines that the eye proximity sensor 103 has not detected the eye proximity.

When the eye proximity sensor 103 detects the eye proximity in step S502 (the first condition is satisfied) ("Y" in step S502), the controller 130 performs focus detection processing (corresponding to the focus operation) (S504).

On the other hand, when it is determined that the eye proximity sensor 103 does not sense the eye proximity in step S502 (the first condition is not satisfied) ("N" in step S502), the controller 130 determines whether the still image release button 201 is pressed halfway (corresponding to a second condition) (S503). When the controller 130 determines that the still image release button 201 is pressed halfway (the second condition is satisfied) ("Y" in step S503), the controller 130 performs the focus detection processing (S504).

In the focus detection processing (S504), the controller 130 instructs the lens controller 105 to move the focus lens 111 in the direction of increasing the contrast value of the image data acquired from the image processor 122. The focus detection processing is performed repeatedly until the contrast value of the image data which is acquired for each image capturing operation reaches the maximum. On that occasion, the controller 130 stores information indicating whether the focus detection processing is triggered by "sensing of eye proximity" or "halfway-pressing of the still image release button 201".

After that, the controller 130 determines whether the AF operation has completed (step S505). Specifically, when the controller 130 determines that the contrast value of the image which is acquired from the image processor 122 has reached the maximum, the controller 130 determines that the AF operation has completed. When the AF operation has completed ("Y" in step S505), the controller 130 instructs the lens controller 105 to keep the focus lens 111 stop to lock the AF (S506). At the same time, the controller 130 sets the AF lock flag. After locking the AF, the controller 130 finishes the current AF operation.

Also when the controller 130 determines that the still image release button 201 is not pressed halfway in step S503 (the second condition is not satisfied) ("N" in step S503) and that the AF operation has not completed in step S505 ("N" in step S505), the controller 130 finishes the current AF operation.

On the other hand, when the AF is locked, i.e., the AF lock flag is set in step S501 ("Y" in step S501), the controller 130 determines whether the still image release button 201 is pressed halfway (S507).

When the still image release button 201 is pressed halfway ("Y" in step S507), the controller 130 finishes the AF operation. When the still image release button 201 is not pressed halfway ("N" in step S507), the controller 130 determines whether a trigger for the focus detection processing is the sensing of eye proximity (S508).

When the sensing of eye proximity is a trigger for the focus detection processing ("Y" in S508), the controller 130 determines whether a predetermined time has passed after the AF was locked (S509).

When the predetermined time has passed after the AF was locked ("Y" in step S509), the controller 130 releases the AF lock state (S510). At the same time, the controller 130 clears the AF lock flag. After releasing the AF lock state, the controller 130 finishes the current AF operation. On the other hand, when the predetermined time has not passed after the AF was locked ("N" in step S509), the controller 130 finishes the current AF operation without releasing the AF lock state.

Further, when the trigger for the focus detection processing is not the sensing of eye proximity in step S508, i.e., the focus detection processing is triggered by the halfway-pressing of the still image release button 201 ("N" in S508), the controller 130 releases the AF lock state (S510) and finishes the AF operation.

The control of the AF operation as described above allows the AF operation to be performed as soon as the user looks into the viewfinder 101. As a result, the user can focus on the subject without performing an operation such as the halfway-pressing on the still image release button 201. That the user can start taking a photograph by pressing the still image release button 201 as soon as looking into the viewfinder 101. After the AF operation, the AF lock state can be held for a predetermined time. Therefore, a new AF operation which would be triggered by the fully-pressing is not performed even when the still image release button 201 is pressed fully in the above described AF lock state. As a result, the user can instantly start the shooting operation without waiting for a time required from the start to the end of the AF operation. Further, the AF lock state is released after elapse of a predetermined time. Thus, when the user carefully determines the composition (as a result, a predetermined time passes) and then the user fully presses the still image release button 201, the AF operation can be performed from the beginning.

3. Summarization

As described above, the digital camera 100 of the present embodiment includes the CCD image sensor 120 which captures an image of a subject and outputs image data, the optical system 110 which includes a focus lens 111 and forms an image of the subject on the CCD image sensor 120, the viewfinder 101 which allows a user to confirm the subject to be captured, the eye proximity sensor 103 which senses or detects proximity of an object (ex. human eye, human face, and so on) to viewfinder 101, and the controller 130 which performs focus operation to drive the focus lens 111 to focus on the image of the subject when the eye proximity sensor 103 senses proximity of an object, and fixes the position of the focus lens 111 until a predetermined condition is satisfied after completion of the focus state.

With the above described configuration, the autofocus function is implemented when the user is looking into the viewfinder 101, so that the user can promptly capture a desired image, thus improving convenience of the digital camera 100.

4. Other Embodiments

As described above, the first embodiment has been discussed as an example of the technology disclosed in the present application. However, the technology in the present disclosure is not limited to that embodiment, and may also be applied to other embodiments which are subject to modification, substitution, addition, or omission as required. Also, the respective constituent elements described in the first embodiment may be combined to form a new embodiment. Then, other embodiments will be exemplified below.

In the above described embodiment, although the controller 130 of the digital camera 100 performs the focus detection processing every time the eye proximity is sensed, the controller 130 may be configured to perform the focus detection processing when the eye proximity is sensed only in the case where the luminance is higher than a predetermined value. Since the focus detection processing tends to be unstable under low luminance, the above described control can prevent the AF from being locked in an unintentional focusing state.

Further, when the digital camera 100 is of an interchangeable lens type, the condition of the attached lens may be added to the condition of performing the focus detection processing in response to the sensing of eye proximity. Here, the condition of the lens includes the lens type (telephoto, macro lens, etc.) and the motor speed for the focus lens. For example, the focus detection processing tends to take a long time in telephotography and close-up photography. Therefore, in the case where the lens is telephoto lens or macro lens, the digital camera 100 may be configured not to perform the focus detection processing even when the eye proximity is sensed. As a result, it can prevent user's inconvenience caused by waiting time for the focus detection processing.

Further, the condition that the eye proximity is kept being sensed more than a certain time period may be further added to the condition of performing the focus detection processing in response to the eye proximity sensing. For example, in the flow chart of FIG. 5, the focus detection processing (S504) is performed based on one event of eye proximity sensing (S502). However, it may be configured to perform the focus detection processing (S504) when the eye proximity is continuously sensed for a predetermined plurality of times in step S502. That configuration can prevent unprepared focus detection processing from being performed when the framing is still unstable immediately after the user actually started bringing his eye to the camera.

In the above described embodiment, the control related to the focus detection processing may be switched according to the trigger of the focus detection processing. For example, it may be configured to output an icon on the liquid crystal display monitor 123 (or the viewfinder 101) or to output a notification sound from a speaker in response to the AF lock state, in the case where the trigger of the focus detection processing is other than the sensing of eye proximity. On the other hand, in the case where the trigger of the focus detection processing is the sensing of eye proximity, it may be configured not to output an icon which would be displayed on the viewfinder or not to output a notification sound which would be output from a speaker in response to the AF lock sate. Such a control can prevent display or sound from accidentally being output when the eye proximity sensor 103 makes false sensing in such a case where the user hangs the camera from his neck. Further, it may also be configured not to emit an AF fill light which would be emitted when the subject is at low illumination intensity in the focus detection processing, in the case where the trigger of the focus detection processing is the sensing of eye proximity. Similar to the above described case, that control can prevent the AF fill light from being accidentally emitted when the eye proximity sensor 103 makes false sensing. Further, in the case where the trigger of the focus detection processing is the sensing of eye proximity, the time-out limit for the focus detection processing may be shorter than the time-out limit in the case where the trigger of the focus detection processing is other than the sensing of eye proximity. That configuration can prevent the focus detection processing in sensing the eye proximity from getting too long to irritate the user.

In the above described embodiment, the condition of releasing the AF lock in the case where the trigger of the focus detection processing is the sensing of eye proximity is the elapse of a predetermined time. However the fact that the eye proximity is no longer sensed may be the condition of releasing the AF lock in addition to or in the place of the above condition. In that case, the AF lock state is released as soon as the user brings his eye away from the viewfinder 101 while the AF is locked due to the sensing of eye proximity, unnecessary lock state can be prevented.

Further, sensing of the blur of the digital camera 100 by a camera shake sensing unit such as an acceleration sensor may be the condition of releasing the AF lock state. In that case, when the subject is changed by panning or the like while the AF is locked due to the sensing of eye proximity, the panning can be sensed as a blur. Therefore, the AF lock state is released instantly and can prevent an unnecessary lock state.

When the still image release button 201 is pressed fully after the halfway-press operation within a predetermined time (for example, 0.4 second) while the position of the focus lens 111 is fixed after the focus operation performed in response to the sensing of eye proximity, the digital camera 100 may control the CCD image sensor 120 to perform an image capture operation without performing a new focus operation. When the still image release button 201 is pressed fully after the halfway-press operation for not less than the predetermined time, the digital camera 100 may control the CCD image sensor 120 to perform the image capture operation after performing the focus operation.

When the still image release button 201 is pressed fully during the focus operation performed in response to the sensing of eye proximity, the digital camera 100 may control the CCD image sensor 120 to perform the image capture operation after the completion of the focus operation.

Although the above described embodiment describes an electronic viewfinder as an example of the finder for user's confirming a subject, an optical viewfinder may be used as the finder.

The embodiment has been described above as an example of the technology of the present disclosure. For that purpose, the accompanying drawings and the detailed description have been provided.

Therefore, the constituent elements shown or described in the accompanying drawings and the detailed description may include not only the constituent elements necessary to solve the problem but also the constituent elements unnecessary to solve the problem in order to exemplify the technology. Accordingly, it should not be instantly understood that the unnecessary constituent element is necessary only because the unnecessary constituent element is shown or described in the accompanying drawings and the detailed description.

Also, since the above described embodiments are for exemplifying the technology of the present disclosure, various changes, substitutions, additions, omissions and the like may be performed on the embodiments without departing from the scope of the claims and the equivalent of the claims.

INDUSTRIAL APPLICABILITY

The present disclosure can improve convenience of the image pickup apparatus which has a viewfinder and an auto-focus function, and thus it can be applied to the digital still camera, a movie, and the like.

What is claimed is:
1. An image pickup apparatus comprising:
an imaging unit configured to capture an image of a subject to output captured image data;
an optical system configured to form an image of the subject on the imaging unit, the optical system including a focus lens;
a viewfinder configured to allow a user to view the subject;
a proximity sensor configured to sense proximity of an object to the viewfinder; and
a controller configured to perform a focus operation to drive the focus lens based on a value calculated from the captured image data to focus on the image of the subject when the proximity sensor senses proximity of the object, and lock a state of auto-focus by fixing a position of the focus lens after completion of the focus operation until a predetermined condition is satisfied, wherein
the focus operation is contrast auto-focus (AF) which decides a moving direction of the focus lens based on an evaluation value calculated from the captured image data output from the imaging unit, and the controller maintains the locked state of autofocus in the contrast AF until the predetermined condition is satisfied, even though the focus operation is requested.

2. The image pickup apparatus according to claim 1, wherein the predetermined condition is satisfied when a predetermined time period has passed after the completion of the focus operation.

3. The image pickup apparatus according to claim 1, further comprising a shake sensor configured to sense a shake of the image pickup apparatus, wherein the predetermined condition includes at least any one of the following: the shake sensor senses the shake of the image pickup apparatus; the proximity sensor no longer senses proximity of the object; and a predetermined time period has passed after completion of the focus operation.

4. The image pickup apparatus according to claim 1, comprising an instruction receiver configured to receive an instruction from outside of the image pickup apparatus, wherein:

the controller further performs the focus operation when the instruction receiver receives a predetermined instruction; and the controller does not perform a predetermined operation in the focus operation which is performed in response to sensing of proximity of an object by the proximity sensor, but performs the predetermined operation in the focus operation which is performed in response to the predetermined instruction received by the instruction receiver.

5. The image pickup apparatus according to claim 4, wherein the predetermined operation is at least one of the following: an operation of lighting a fill light; and an operation of outputting a sound indicating that the image of the subject is focused.

6. The image pickup apparatus according to claim 1, further comprising a shutter button which can be operated by pressing the shutter button fully or halfway, wherein:

when the shutter button is pressed fully after halfway pressing of the shutter button within a predetermined time while the position of the focus lens is fixed after the focus operation performed in response to sensing of proximity of an object by the proximity sensor, the controller controls the imaging unit to perform an image capturing operation without performing a new focus operation.

7. The image pickup apparatus according to claim 1, further comprising a shutter button which can be operated by pressing the shutter button fully or halfway, wherein:

in the case where the shutter button is pressed fully while the focus operation is performed in response to sensing of proximity of an object by the proximity sensor, the controller controls the imaging unit to perform the image capturing operation after the completion of the focus operation.

8. The image pickup apparatus according to claim 1, further comprising a release button configured to start a focus operation when the release button is pressed, wherein while the position of the focus lens is fixed, the controller does not drive the focus lens even though the release button is pressed.

9. The image pickup apparatus according to claim 1, wherein the controller is further configured to set an AF lock flag when the auto-focus is set in the locked state and to clear the AF lock flag when the auto-focus is released from the locked state.

* * * * *